United States Patent [19]

Rashid

[11] Patent Number: 5,285,147
[45] Date of Patent: Feb. 8, 1994

[54] DIGITAL VOLTAGE REGULATOR

[75] Inventor: Abdul Rashid, Rockford, Ill.

[73] Assignee: Sundstrand Corporation, Rockford, Ill.

[21] Appl. No.: 723,720

[22] Filed: Jun. 19, 1991

Related U.S. Application Data

[63] Continuation of Ser. No. 430,818, Nov. 2, 1989, abandoned.

[51] Int. Cl.$^5$ .............................. H02P 9/00; H02P 9/30
[52] U.S. Cl. ........................................ 322/28; 322/20; 322/73
[58] Field of Search ....................... 322/24, 25, 28, 29, 322/73, 20

[56] References Cited

U.S. PATENT DOCUMENTS

| | | | |
|---|---|---|---|
| 4,262,242 | 4/1981 | Glennon | 322/28 |
| 4,322,630 | 3/1982 | Mezera et al. | 290/40 C |
| 4,403,292 | 9/1983 | Ejzak et al. | 307/71 X |
| 4,463,306 | 7/1984 | de Mello et al. | 322/25 |
| 4,477,765 | 10/1984 | Glennon et al. | 322/20 |
| 4,559,487 | 12/1985 | Sims et al. | 322/73 X |
| 4,595,965 | 6/1986 | Glennon | 361/20 |
| 4,617,626 | 10/1986 | Morishita et al. | 322/23 X |
| 4,651,081 | 3/1987 | Nishimura et al. | 322/29 X |
| 4,682,097 | 7/1987 | Matsui | 322/29 X |

OTHER PUBLICATIONS

"Radio Shack the Technology Dictionary" Pub. by Master Pub., Inc., 1988, p. 169.

Primary Examiner—R. J. Hickey
Attorney, Agent, or Firm—Wood, Phillips, VanSanten, Hoffman & Ertel

[57] ABSTRACT

The problems of minimizing size and weight in aircraft and avoiding requirements for custom design are minimized in a digital voltage regulator circuit (120).

The circuit (120) includes a programmed processor circuit (124) having a memory circuit (138), and a drive circuit (132) operatively coupled with the processor circuit (124) for developing an exciter control signal.

This circuit (120) is manufactured using custom very large scale integration (VLSI) technology to reduce size, weight, life cycle costs and improve reliability.

12 Claims, 5 Drawing Sheets

DIGITAL VOLTAGE REGULATOR

This application is a continuation, of application Ser. No. 430,818, filed Nov. 2, 1989 now abandoned.

FIELD OF THE INVENTION

This invention relates to electrical power generating systems and, more particularly, to an improved generator control unit voltage regulator for developing constant voltage output power.

BACKGROUND OF THE INVENTION

A conventional electrical power generating system (EPGS) for an aircraft, in one known form, comprises an integrated drive generator including a constant speed drive and a generator. The integrated drive generator receives mechanical power at varying speed from an aircraft engine and delivers electrical power at constant frequency. The constant speed drive includes a speed control assembly and receives mechanical input power at varying speed from the aircraft engine and delivers power from its output shaft at constant speed. The generator comprises a salient pole machine with a rotating field which is excited through an exciter powered by a permanent magnet generator (PMG) through a voltage regulator. Such conventional systems use a generator control unit (GCU) to provide voltage regulation and speed regulation. Specifically, a voltage regulator provides excitation power to an exciter at levels which provide constant system voltage at the point of regulation. A speed control controls trimming of a servo valve to maintain generator speed, and thus frequency, to be constant.

Prior generator control units used either analog or digital circuits, with the choice being based on factors such as weight, size, cost and complexity of control logic. In analog systems both integrated circuits and discrete components are used and some signals are converted to digital form. However, signals are combined and perform their required functions using analog type control. Such system products incorporate standard, off-the-shelf components. Implementing a system which has the complexity of a generator control unit with standard product technology requires the use of many hundreds of electronic devices even for a relatively simple application, such as for a single channel EPGS. Each device adds additional weight to the product, including indirect weight in the form of additional circuit board area and housing needed to support the inclusion of each device. Since commercial and military aircraft are the intended end use of such products, it is desirable to minimize weight.

Further, analog circuits tend to be environmentally sensitive. For example, parameter drift results owing to changes in temperature and humidity, as well as age of the devices. Further, with analog technology the control cannot be easily changed. Instead, circuit components must be modified resulting in custom design for each different application.

In digital control systems, conversely, all signals are converted to digital form and certain control and protection functions are controlled by a microprocessor. As such, the control system is inherently more flexible in implementing different control schemes. In a digital control system the control unit contains a microprocessor and associated software and continuously and sequentially checks for proper system conditions and for commands, and performs the programmed sequence of instructions. However, the actual flexibility available with such a digital system is limited due to limitations in processing time available in the microprocessor for performing both control and protection functions. In f act, known GCU systems employ an analog control for implementing the voltage regulator functions. As a result, it is necessary to provide circuit components associated with voltage regulation.

Additional problems result in the design of generator control units. In each application it is necessary to develop a cost effective, lightweight solution. Therefore, the designer must start from "scratch" in designing a generator control unit for each new application. This results in each generator control unit being custom made and therefore more expensive.

The present invention is directed to overcoming one or more of the problems discussed above.

SUMMARY OF THE INVENTION

In accordance with the invention, a generator control unit is provided with a digital voltage regulator circuit to reduce size, weight and provide improved reliability.

Broadly, there is disclosed herein a voltage regulator for an electrical power generating system having a generator, with means responsive to a control signal for varying generator output power. The voltage regulator comprises a digital control circuit including a processor having a memory circuit. The processor is responsive to system condition inputs for establishing a parameter of the control signal in accordance with an algorithm, which algorithm includes a gain and compensation function, to maintain generator output power at a desired voltage level. The memory circuit stores the algorithm and coefficients for the gain and compensation function.

In one aspect of the invention, the parameter comprises a duty cycle of operation of a switching device which develops the control signal.

In another aspect of the invention, the memory circuit is a programmable circuit storing the algorithm and the coefficients.

In a further aspect of the invention, the processor includes a sequencer having means for repeatedly implementing the algorithm.

In yet a further aspect of the invention, the digital control circuit further comprises an interface circuit operatively connected to the processor for connection to an external processor and for receiving the coefficients to be stored in the memory circuit.

In yet an additional aspect of the invention the digital control circuit further comprises an interface circuit operatively connecting to the processor for receiving signals representing the system condition inputs. Further, the interface circuit includes means for receiving a plurality of system condition inputs and means for storing data representing each such input in the select storage location in the memory circuit.

In still another aspect of the invention the digital control circuit further comprises an output circuit operatively connected to the processor for developing the control signal in accordance with the established parameter.

In another embodiment of the invention there is disclosed herein a voltage regulator of a generator control unit for an electrical power generating system having a generator including means responsive to a control system for varying generator excitation to control output power. The voltage regulator includes a digital control circuit including a processor and having voltage control means responsive to system condition inputs for establishing a parameter of the control signal to maintain generator output power at a desired voltage level. Overload determining means are provided for detecting the existence of an abnormal system condition. Overload control means are operatively associated with the voltage control means and the overload determining means for modifying the established parameter in response to the existence of an abnormal system condition.

In a further embodiment of the invention there is disclosed herein a generator control unit in an electrical power generating system having a generator including an exciter excited responsive to a control signal for varying main generator output power. The generator control unit comprises a digital voltage regulator circuit including a programmed processor having a memory circuit. The processor implements a program stored in the memory circuit and is responsive to system condition inputs for establishing a command representing a level of the control signal required to maintain main generator output power at a desired level. The drive circuit is operatively coupled with the processor for developing the control signal.

More specifically, a typical electrical power generating system includes a permanent magnet generator, an exciter and a main generator. The PMG develops power which is regulated by a voltage regulator which is part of a generator control unit (GCU). The voltage regulator controls excitation to compensate for changes in load conditions to maintain constant output voltage.

The GCU includes a VLSI integrated circuit chip configured as a custom digital voltage regulator. The voltage regulator chip includes an average voltage control algorithm for maintaining generator output voltage at a desired level, as well as overload control algorithms. The overload control algorithms include a current limit loop, a high phase voltage takeover loop and reactive and real load division loops which are utilized during parallel channel operation of multiple generators.

The voltage regulator chip is preconfigured to provide the desired functionality for any GCU application without hardware redesign. The specific programmed values which are application dependent can be preloaded at startup from a microprocessor or from a ROM memory.

Further features and advantages of the invention will readily be apparent from the specification and from the drawings.

DESCRIPTION OF THE INVENTION

Figure 1:
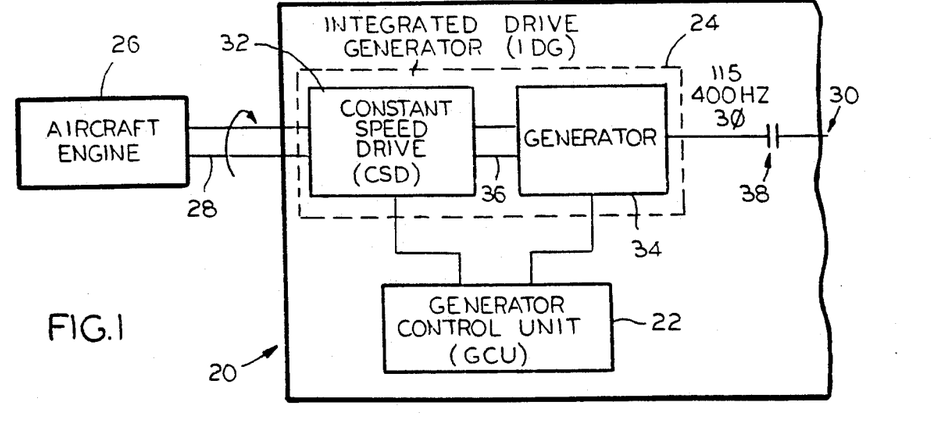
FIG. 1 is a simplified block diagram for an aircraft electrical power generating system (EPGS) including a generator control unit having a voltage regulator according to the invention.

With reference to FIG. 1, a block diagram representation illustrates an electrical power generating system (EPGS) 20 including a generator control unit (GCU) 22 according to the invention. In the illustrated embodiment, the EPGS 20 is used in an aircraft for providing power to aircraft loads. The GCU 22 could be used in connection with various other generating systems, as is obvious to those skilled in the art.

In addition to the GCU 22, the EPGS 20 includes an integrated drive generator (IDG) 24. The IDG 24 receives mechanical power at varying speed from an aircraft engine 26 through a rotating shaft 28 and delivers electric power at constant frequency at a power bus 30. The IDG 24 includes a constant speed drive 32 and a generator 34. The constant speed drive 32 receives mechanical input power from the shaft 28 at varying speed and delivers mechanical power from its output shaft 36 at constant speed. The generator 34 is driven by the shaft 36 and develops electrical output power through suitable fault protection circuits represented by a generator relay or contactor, illustrated schematically at 38, to the bus 30.

Figure 2:
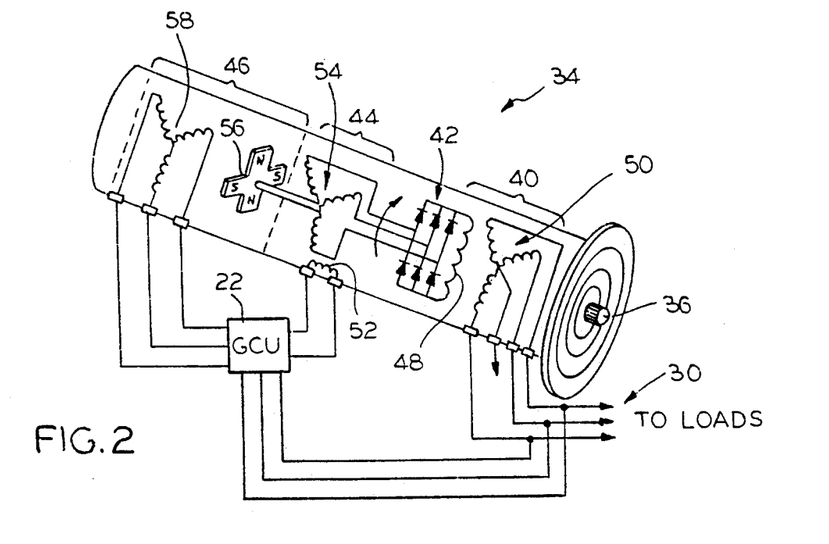
FIG. 2 is a combined schematic and perspective view of an EPGS generator.

With reference also to FIG. 2, the generator 34 includes a main generator 40, a rotating rectifier bridge assembly 42, an exciter 44 and a permanent magnet generator (PMG) 46. Each of the main generator 40, exciter 44 and PMG 46 includes a rotor driven by the constant speed drive 32 via the common shaft 36. As is well known, the generator 34 may be mounted in a common housing with the constant speed drive 32 and, more specifically, may be mounted in line or side-by-side, as is necessary or desired.

The main generator 40 is a salient pole machine having a rotating field producing output power at a frequency of 400 Hz. Particularly, a four pole machine is used at 12,000 rpm, while a two pole machine is used at 24,000 rpm. The main generator 40 includes a rotor carrying a DC field winding 48, and a stator carrying a polyphase AC armature winding 50.

The exciter 44 is a multi-pole salient pole machine which provides excitation to the main generator 40. The exciter 44 includes a stator carrying a DC field winding 52 and a rotor carrying a polyphase AC armature winding 54. The armature winding 54 is connected through the rotating rectifier bridge assembly 42 to the main armature DC field winding 48.

The PMG 46 is a pilot generator in which field flux is provided by a permanent magnet 56 mounted on a rotor driven by the shaft 36 and which is magnetically coupled with a polyphase stator armature winding 58.

The PMG stator winding 58 is connected through the GCU 22 to the exciter DC field winding 52. Although not specifically illustrated herein, the GCU 22 includes a rectifier which converts the polyphase AC power from the PMG stator winding 58 to DC power which is regulated to drive the exciter DC field winding 52.

As is conventional in brushless power generators, rotation of the shaft 36 by the aircraft engine 26 through the constant speed drive 32 and a gearbox, not shown, results in generation of a polyphase voltage in the exciter armature windings 54 as they traverse the magnetic field set up by the exciter DC field winding 52,. This polyphase voltage is rectified by the rotating rectifier bridge assembly 42, and the rectified power is coupled to the main generator field winding 48. The current in the main generator field winding 48 and the rotation of the shaft 36 sets up a rotating magnetic field in space occupied by the main generator stator windings 50. The stator windings 50 develop polyphase output power at constant frequency which is delivered to the AC bus 30 for powering loads.

Figure 3:
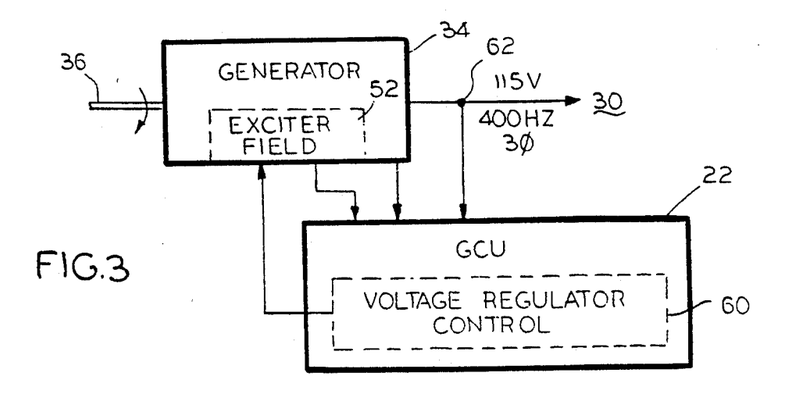
FIG. 3 is a simplified block diagram of a voltage regulator control loop.

With reference also to FIG. 3, a block diagram illustrates a control loop for regulating excitation to the exciter DC field winding 52. Specifically, a voltage regulator control 60 in the GCU 22 controls generator output voltage at a point of regulation (POR) using sensors 62 for sensing system conditions, such as voltage and current. The GCU 22 regulates the energy coupled from the exciter field winding 52 to the exciter armature winding 54 and ultimately to the main generator 40.

Figure 4:
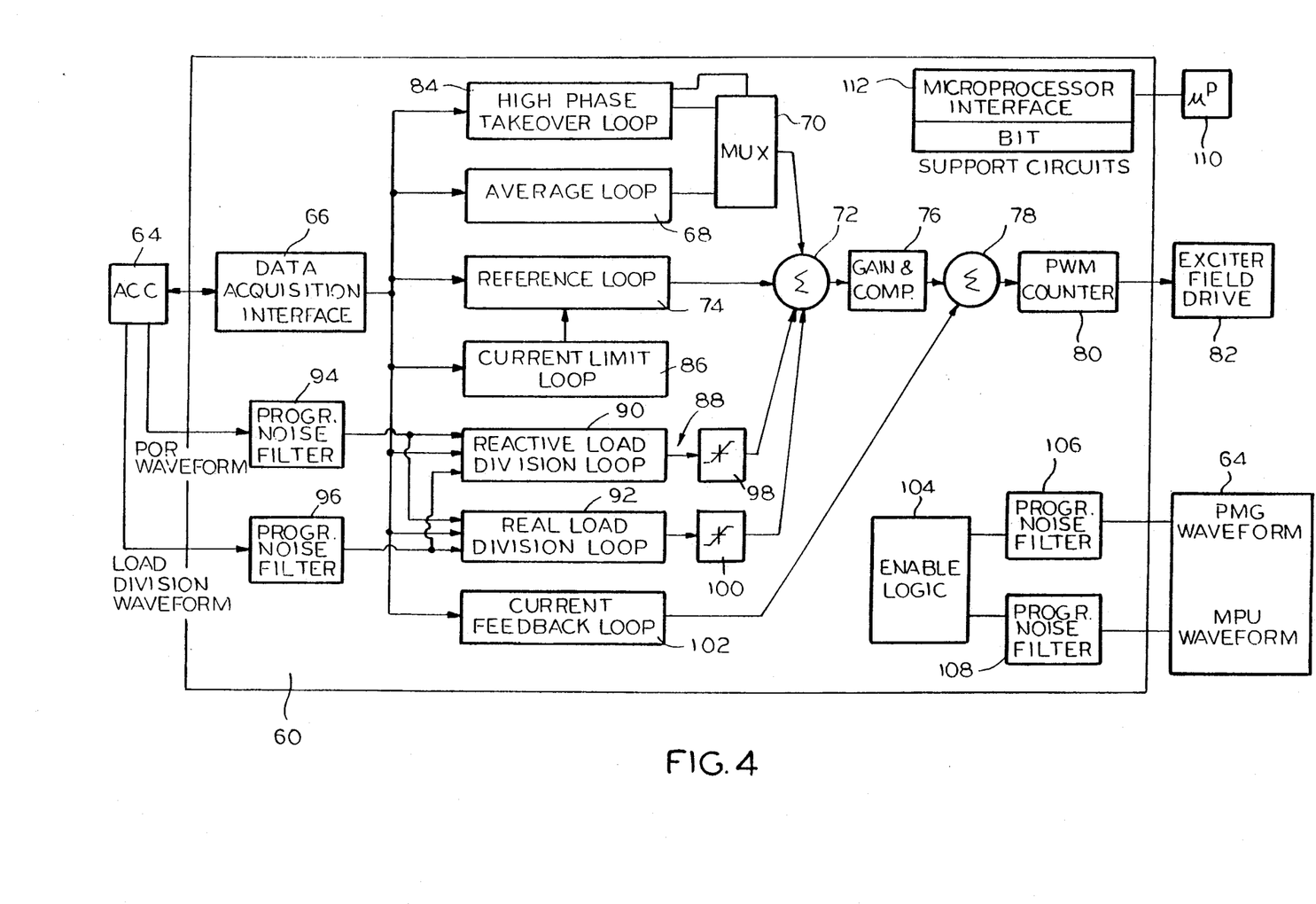
FIG. 4 is a detailed functional block diagram of the control loops implemented in the voltage regulator of FIG. 3.

With reference to FIG. 4, a block diagram illustrates the control loops implemented by the voltage regulator control 60, see FIG. 3. The generator's three phase current and voltage signals are sensed at the point of regulation by sensors 62, see FIG. 3, are conditioned by an analog control circuit 64 and are then sampled by the voltage regulator 60 via a data acquisition interface 66. This information is processed by an average loop 68 and applied through a multiplexer 70 to a first summer 72 which also receives a reference value from a reference loop 74. The first summer 72 calculates an error representing the difference between the POR voltage input and the POR voltage reference. The error is filtered by a gain and compensation function block 76 to allow for stable operation yet have suitably fast transient response over all operating conditions. The filtered error signal is applied via a second summer 78 to a pulse width modulation (PWM) counter 80 to alter the PWM duty cycle of an exciter field drive switching circuit 82 which in turn varies the field current to the exciter field winding 52, see FIG. 3, to vary generator output power.

If one or more of the three phases goes above a threshold of, for example, 122 volts rms, then a high phase takeover loop 84, also connected to the multiplexer 70, takes over control from the average loop 68 to prevent any phases from going higher. During a short circuit in the EPGS 20 a current limit loop 86 connected to the reference loop 74 decreases the POR voltage reference in order to allow a controlled amount of current to flow through the fault. A load division module 88, comprising a reactive load division loop 90 and a real load division loop 92, is operative for multichannel parallel systems. These two loops 90 and 92 receive signals from the analog control circuit 64 representing phase information for the POR waveform and a load division waveform, representing the difference from average current for the particular generator, which are filtered through programmable noise filters 94 and 96, respectively. The outputs of the loops 90 and 92 are passed through limit functions 98 and 100, respectively, to the first summer 72. A current feedback loop 102 is input to the second summer 78 and is used for compensating the change in exciter field resistance over temperature and life and enhances system performance by varying exciter current feedback gain.

An enable logic block 104 receives signals representing the PMG waveform and a magnetic pickup unit waveform from the analog control circuit 64 through programmable noise filters 106 and 108, respectively. The enable logic measures the frequency of the PMG output and the magnetic pickup unit input to the IDG and is used to enable the voltage regulator control loops.

Finally, a microprocessor interface 112, including built-in-test (BIT) and other support circuits, provides an interface between the control loops of the voltage regulator 60 and an external microprocessor 110.

Figure 5:
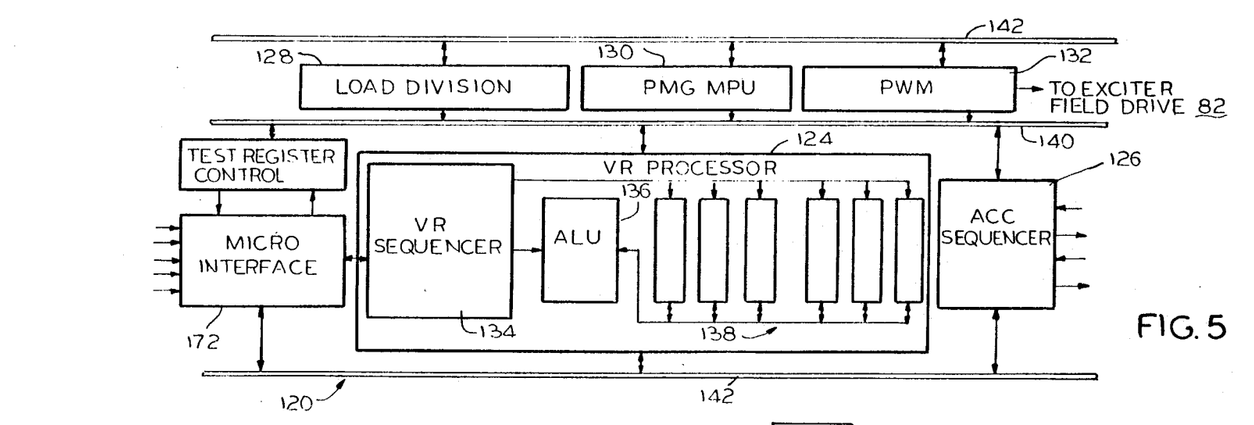
FIG. 5 is a hardware architectural block diagram for the digital voltage regulator circuit.

With reference to FIG. 5, a generalized block diagram illustrates the architecture of a circuit 120 for the voltage regulator 60. In the illustrated embodiment, the voltage regulator circuit 120 uses custom very large scale integration (VLSI) technology to reduce size, weight, life cycle costs and improved reliability. Specifically, owing to the use of VLSI technology, the entire GCU 22 can be built utilizing fewer parts and weighing less and having signal level circuits that are general purpose so that they can be employed in all GCU voltage regulator applications without hardware redesign. The voltage regulator circuit 120 comprises a custom digital chip having 1.25 micron technology using 74k transistors and uses a 10 MHz clock signal.

The principal circuit elements of the voltage regulator circuit 120 comprise a microprocessor interface circuit 122, a processor 124, an analog control circuit (ACC) sequencer circuit 126, a load division circuit 128, a permanent magnet generator and magnetic pickup unit sense circuit 130, and a pulse width modulation drive circuit 132.

The microprocessor interface circuit 122 is an interface module that controls the data transfer between the system microprocessor 110, see FIG. 4, and the voltage regulator circuit 120. Programmable and readable registers and RAM memory within the voltage regulator circuit 120 are mapped to the memory address interface of the microprocessor 110 for chip initialization, BIT function, debug and test operations. Microprocessor interface operations to the voltage regulator circuit 120 are primarily performed during chip initialization which takes place immediately after system reset.

Figure 6:
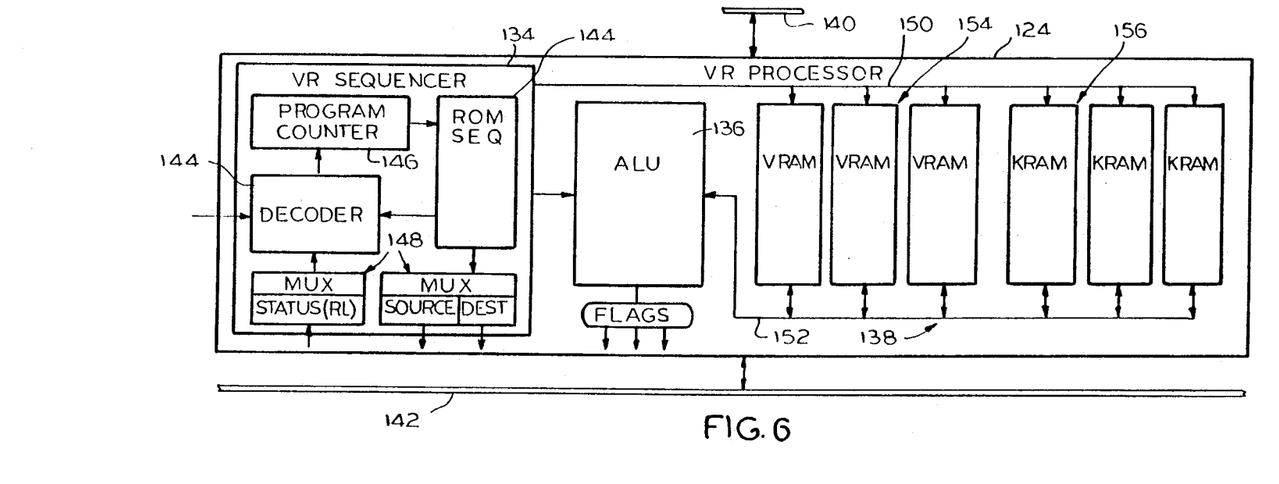
FIG. 6 is a detailed hardware block diagram of a processor circuit for the voltage regulator of FIG. 5.

With reference also to FIG. 6, the voltage regulator processor 124 interfaces with all of the other voltage regulator circuits and performs all calculations and temporary storage of internal variables. The components of the processor 124 are a sequencer 134, an arithmetic logic unit 136, and a plurality of RAM memory circuits 138. As indicated schematically, each of the sequencer 134, arithmetic logic unit 136 and memory circuits 138 are operatively connected to a system address bus 140 and data bus 142.

The sequencer 134 controls the operation of the loop functions illustrated in FIG. 4. Any of the loop functions, namely, load division, current loop, high phase takeover, POR average and the main loop including an exciter field feedback current, can be accessed by the sequencer 134. Specifically, the sequencer 134 sends out a request, the loop function then performs its task, and returns an acknowledge flag for completion. The sequencer's algorithm is centered around the POR average voltage loop 68, discussed above.

The sequencer 134 includes a ROM based sequencer 144 controlled by a program counter 146. The ROM based sequencer 144 implements the control loops and filter control. A decoder 148 receives information from the ROM based sequencer 144, the microprocessor interface 122, see FIG. 5, and through an internal multiplexer 148 for communicating with the program counter 146. The multiplexer 148 also is used to send out requests from the sequencer 144 internally within the processor 124.

The program implemented by the sequencer 134 is downloaded from the system microprocessor 110 at initialization along with the necessary constants for implementing the same.

The ALU 136 is used to perform fixed point multiplication, addition, subtraction, etc. It sends out flags as necessary to the ROM based sequencer 144 and communicates through the multiplexer 148. The sequencer 134 and ALU 136 communicate with the voltage regulator memory circuits 138 via an internal address bus 150 and an internal data bus 152. The memory circuits 138 are divided into a first section of a VRAM 154 containing variables generated by the voltage regulator processor 124 and KRAM 156 storing constants.

Figure 7:
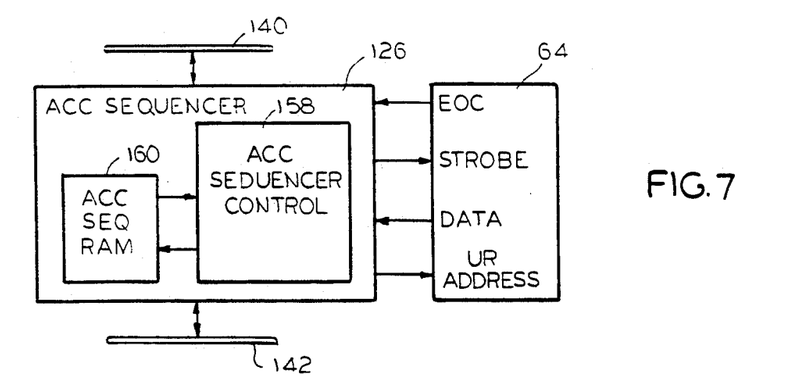
FIG. 7 is a detailed hardware block diagram of the analog control chip sequencer interface circuit of the voltage regulator of FIG. 5.

With reference also to FIG. 7, the ACC sequencer circuit 126 is used to provide an interface to the analog control circuit 64 and communicates on the data bus 140 and address bus 142. Specifically, the ACC sequencer circuit 126 is a ten bit interface which communicates with a ten bit analog/digital (A/D) converter of the analog control circuit 64, and a multiplexer consisting of twelve channels. The digitized information is controlled by an ACC sequencer control 158 and stored in RAM memory 160. The sequencer control 158 receives end-of-conversion (EOC) and ten BIT data lines, and provides the multiplexer address and the strobe control signals to control the analog control circuit A/D converter.

Figure 8:
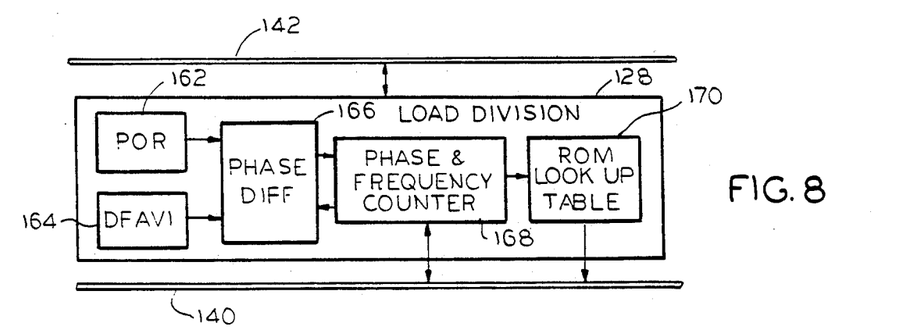
FIG. 8 is a hardware block diagram for a load division circuit of the voltage regulator of FIG. 5.

With reference also to FIG. 8, the load division circuit 128 is connected to the data bus 140 and address bus 142 and is a peripheral circuit which is free running and generates a completion flag to update information. The load division circuit 128 is used in multi-channel operation and operates to divide the load equally between multiple generators.

The load division circuit receives the POR voltage waveform signal at a block 162 and a signal representing the difference from average current waveform at a block 164. A block 166 determines the phase difference between the two waveforms using a phase and frequency counter circuit 168. A ROM lookup table 170 determines the sine and cosine of the phase difference to determine real and reactive components of the power for use in the load division loops, see FIG. 4.

Figure 9:
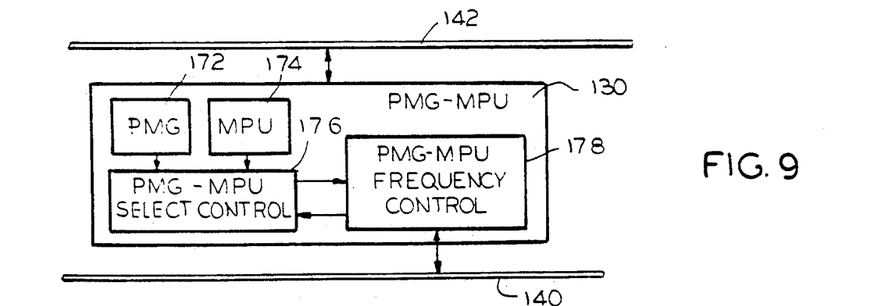
FIG. 9 is a detailed hardware block diagram of the permanent magnet generator and magnetic pickup unit sense circuit of the voltage regulator of FIG. 5.

With reference also to FIG. 9, the PMG and MPU sense circuit 130 also communicates on the data bus 140 and address bus 142 and is a free running peripheral circuit that generates a completion flag to update new cycle information. The PMG and MPU frequency sense circuit 130 is used to enable or disable the output driver of the PWM circuit 132 to the exciter field via magnetic pickup ready speed or PMG under frequency.

Specifically, a signal representing the PMG output waveform is received at a block 172, and a signal representing output from a magnetic pickup unit, representing generator speed, is received at a block 124. The blocks 122 and 124 are connected to a PMG-MPU select control 126 to allow the flexibility to select either PMG and/or MPU frequency to enable or disable voltage regulation, depending upon system requirements.

A PMG-MPU frequency control 128 measures frequency of either or both of the signals on the rising edge of every cycle to determine whether the same are above or below a threshold.

Figure 10:
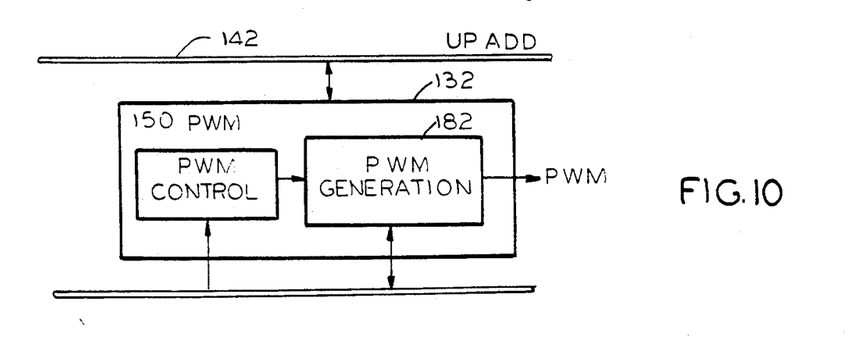
FIG. 10 is a detailed hardware block diagram of the pulse width modulation drive circuit of the voltage regulator of FIG. 5.

With reference also to FIG. 10, the PWM circuit 132 is operatively connected to the data bus 140 and the address bus 142 and is a peripheral circuit which is free running at variable frequencies from 1.22 kHz up to 9.76 KHz. The PWM circuit 132 provides a controlling output to the exciter field 52 via the current driver circuit 82, see FIG. 4, for regulation of the system voltage. It accepts the calculated input from the voltage regulator control loops, see FIG. 4, which determine the characteristics of the square wave output.

The PWM circuit 132 includes a PWM control circuit 180 connected to a PWM generation circuit 182. The PWM control 180 receives a PWM enable signal generated by the PMG and MPU sense circuit 130 and uses a counter to generate the appropriate PWM output waveform. The PWM generation circuit 182 includes a comparator coupled to the control block counter for developing the PWM output.

Figure 11:
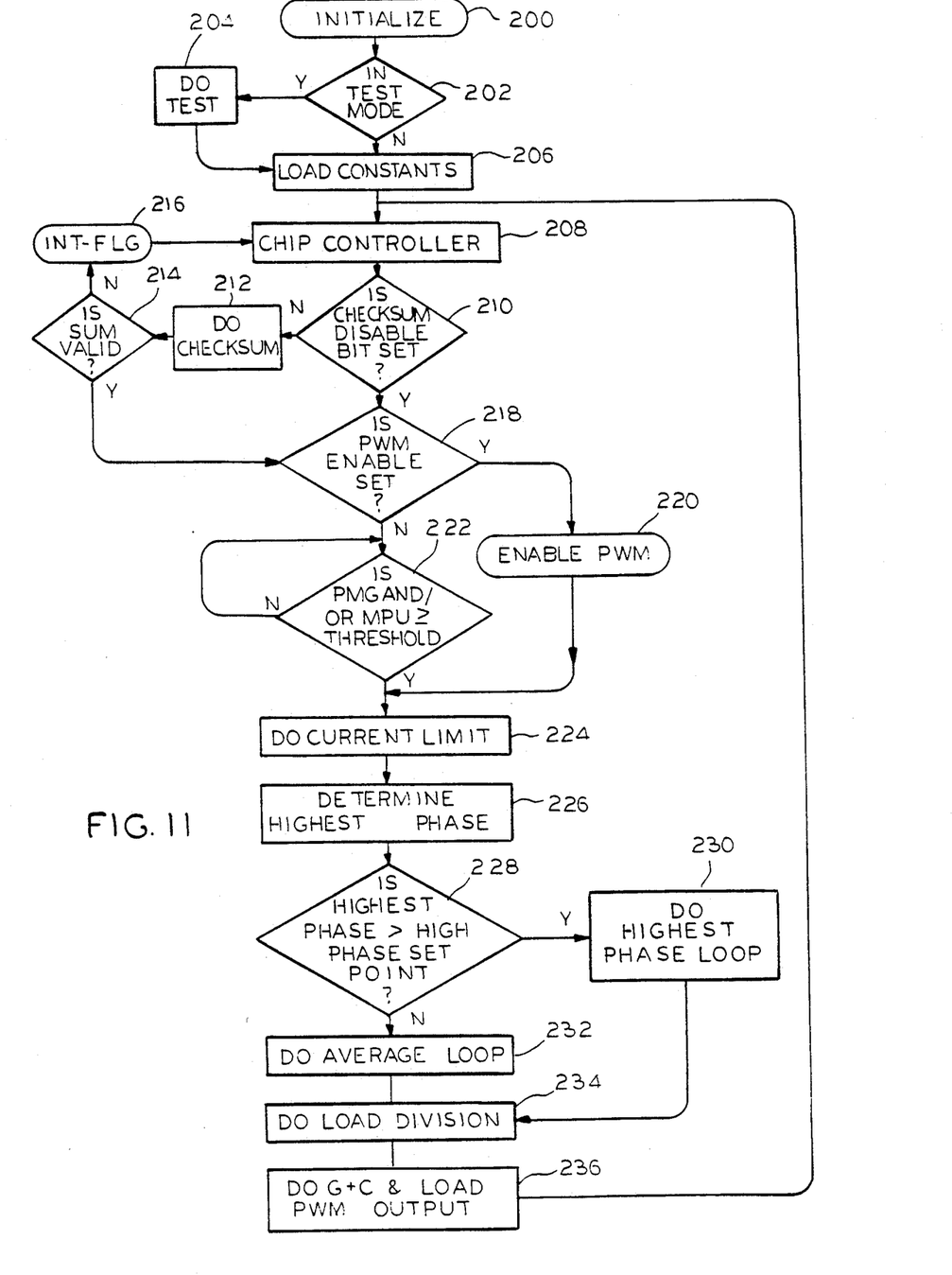
FIG. 11 is a flow chart illustrating the implementation of the control loops of FIG. 4 by the processor of FIG. 6.

With reference also to FIG. 11, a flow diagram illustrates flow of the main control program implemented in the sequencer 134, see FIG. 6.

The system is initialized at a block 200 at startup or reset and proceeds to a decision block 202 which determines whether or not the system is in a test mode. If so, then necessary tests are undertaken at a block 204. Thereafter, or if the system is not in the test mode, then the necessary constants are loaded at a block 206 and control advances to a chip controller block 208 which begins testing of chip operation. Specifically, a decision block 210 determines whether a checksum disable bit is set. If not, then a checksum routine is performed at a block 212. A decision block 214 then determines if the checksum value is valid. If not, then an interrupt flag is set at a block 216 and control returns to the block 208.

If the checksum is valid, as determined at the decision block 214, or the checksum disable bit is set, as determined at the decision block 210, then a decision block 218 determines if the PWM enable logic has been set. This determination is made in accordance with the PMG-MPU frequency control 178, see FIG. 9, discussed above. If so, then an enable PWM flag is set at a block 220. If not, then a decision block 222 determines whether the PMG and/or MPU frequency are greater than or equal to a threshold. Control is halted until this condition is satisfied. Thereafter, or if the PWM was enabled at the block 220, then control advances to perform the voltage regulator loop functions illustrated above in FIG. 4.

The voltage regulation loop functions are initiated at a block 224 which performs the current limit loop 86, see FIG. 4, to determine if POR current is greater than a select reference such as, for example, 2.0 per unit current. If so, then the POR voltage reference is decreased in a controlled manner at the reference loop 74, see FIG. 4. Thereafter, a high phase takeover loop 84, see FIG. 4, is implemented at a block 226 which determines the highest average voltage for the three phases. A decision block 228 then determines if the highest of the three phases is greater than a high phase set point value. This operation is effectively performed by the multiplexer 70, see FIG. 4. Specifically, if the highest phase voltage is greater than the high phase set point, then the highest phase loop 84, see FIG. 4, is implemented at a block 230. If not, then the average voltage loop 68, see FIG. 4, is implemented at a block 232. From either block 230 or 232 control advances to the block 234 which implements the load division loops 90 and 92, see FIG. 4. Finally, after all of the loop functions have been performed, the main loop including the gain and compensation block 76 and loading of the PWM output at block 80, see FIG. 4, are performed at a block 236. Although not specifically illustrated, this block also implements the current feedback loop 102, see FIG. 4.

From the block 236 control returns to the block 208, discussed above.

In operation, the microprocessor 110, see FIG. 4, downloads the algorithm for the control loops and the necessary constants required by the voltage regulator circuit 120 to implement the control loops, see FIG. 4. These constants may include coefficients to be stored in the RAM memory 138, see FIG. 5, for the gain and compensation function, as well as setpoints and the like. The voltage regulator circuit 120 latches the addresses internally and permits the microprocessor 110 to write the constants in the voltage regulator chips' memory circuits 138 on powerup and whenever the voltage regulator circuit 120 interrupts the microprocessor 110.

Thus, in accordance with the above, a generator control unit for an electrical power generating system is provided with a digital control circuit for implementing voltage regulation. The circuit is manufactured using custom very large scale integration (VLSI) technology to reduce size, weight, life cycle costs and improve reliability. Specifically, owing to the use of VLSI technology, the GCU 22 can be built utilizing fewer parts and having less weight and having signal level circuits of a general purpose so that they can be employed in all GCU applications without hardware redesign.

Further, the voltage regulator permits control loops to be implemented in digital circuitry using constants loaded in from a supervisory microprocessor, including the implementation of protection control loops.

I claim:

1. In an electrical power generating system having a generator, sensing means for sensing generator system conditions, and means responsive to a control signal for varying generator output power, a voltage regulator comprising:
a digital control circuit comprising a single VLSI digital chip including an input circuit operatively connected to said sensing means and a processor having a memory circuit and an output circuit developing said control signal which comprises a pulse width modulated signal, said processor being responsive to system condition inputs for establishing a duty cycle of the control signal in accordance with an algorithm, which algorithm includes a control loop determining a difference between the sensed system conditions and desired system conditions to determine an error and a gain and compensation function responsive to such error for developing said duty cycle of the pulse width modulated control signal to maintain generator output power at a desired voltage level, and said memory circuit storing said algorithm and coefficients for said gain and compensation function.

2. The voltage regulator of claim 1 wherein said memory circuit includes a programmable memory circuit storing said algorithm and said coefficients.

3. The voltage regulator of claim 1 wherein said processor includes a sequencer having means for repeatedly implementing said algorithm.

4. The voltage regulator of claim 1 wherein said digital control circuit further comprises an interface circuit operatively connected to said processor for connection to an external processor and for receiving said coefficients to be stored in said memory circuit.

5. The voltage regulator of claim 1 wherein said input circuit comprises an interface circuit operatively connected to said processor for receiving signals representing said system condition inputs from said sensing means.

6. The voltage regulator of claim 5 wherein said interface circuit includes means for receiving a plurality of system condition inputs and means for storing data representing each such input in a select storage location in said memory circuit.

7. In an electrical power generating system having a main generator including an exciter excited responsive to a control signal for varying main generator output power and sensing means for sensing generator system conditions, a generator control unit comprising,
a digital VLSI voltage regulator circuit chip including an input circuit operatively connected to said sensing means, a programmed processor circuit having a memory circuit, said processor circuit implementing a program stored in said memory circuit, said program including a control loop responsive to the system conditions for establishing a command representing a level of said control signal required to maintain main generator output power at a desired voltage level, and a drive circuit operatively coupled with said processor for developing said exciter control signal, said drive circuit developing a pulse width modulated signal having a duty cycle in accordance with said command.

8. The generator control unit of claim 7 wherein said programmed processor circuit includes means for detecting existence of an abnormal system condition, and means operatively associated with said detecting means for modifying the command in response to the existence of an abnormal system condition.

9. The generator control unit of claim 7 wherein said program includes a gain and compensation function for stabilizing operation of said control loop and said memory circuit stores coefficients for said gain and compensation function.

10. The generator control unit of claim 9 wherein said voltage regulator circuit chip further comprises an interface circuit operatively connected to said processor for connection to an external processor and for receiving said coefficients to be stored in said memory circuit.

11. The generator control unit of claim 7 wherein said processor circuit includes a sequencer having means for repeatedly implementing said program.

12. The generator control unit of claim 7 wherein said input circuit includes means for receiving a plurality of system condition inputs and means for storing data representing each such input in a select storage location in said memory circuit.

* * * * *